United States Patent
Hsieh et al.

(10) Patent No.: US 6,727,994 B2
(45) Date of Patent: Apr. 27, 2004

(54) Z-AXIS MONITORING APPARATUS FOR ROBOT BLADE

(75) Inventors: Chung-Ju Hsieh, Taipei (TW); Hsi-Wen Liao, Nantou (TW); Yi-Ming Lin, Chung-Hwa (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 10/180,653

(22) Filed: Jun. 26, 2002

(65) Prior Publication Data

US 2004/0001206 A1 Jan. 1, 2004

(51) Int. Cl.⁷ .............................................. G01B 11/14
(52) U.S. Cl. ...................... 356/623; 356/602; 356/3.1; 250/559.08
(58) Field of Search ..................... 356/602, 614–623, 356/407, 301, 306.31, 3.13–3.14, 3.01, 3.05, 3.1, 4.07; 73/865.9; 250/559.08, 559.22, 559.23, 559.4, 559.31, 234, 205, 559.39

(56) References Cited

U.S. PATENT DOCUMENTS

| | | | | |
|---|---|---|---|---|
| 4,705,395 A | * | 11/1987 | Hageniers | 356/3.06 |
| 4,864,147 A | * | 9/1989 | Ikari et al. | 250/559.22 |
| 4,920,273 A | * | 4/1990 | Sacks et al. | 250/559.08 |
| 5,179,287 A | * | 1/1993 | Kitajima et al. | 250/559.31 |
| 5,500,728 A | * | 3/1996 | Nishimoto | 356/3.03 |
| 5,519,204 A | * | 5/1996 | Rudd et al. | 250/205 |
| 5,546,179 A | * | 8/1996 | Cheng | 356/73 |
| 5,608,211 A | * | 3/1997 | Hirono et al. | 250/234 |
| 5,917,600 A | * | 6/1999 | Rongo et al. | 356/622 |
| 6,244,121 B1 | * | 6/2001 | Hunter | 73/865.9 |

* cited by examiner

Primary Examiner—Frank G. Font
Assistant Examiner—Sang H. Nguyen
(74) Attorney, Agent, or Firm—Tung & Associates

(57) ABSTRACT

An apparatus for monitoring the Z-axis position of a transfer blade on a wafer transfer robot which transfers wafers among multiple chambers in a semiconductor fabrication facility. The invention comprises a CCD laser displacement sensor which measures the height or Z-axis position of the transfer blade and generates an analog voltage the value of which depends on the height of the transfer blade. An analog controller connected to the CCD laser displacement sensor converts the analog voltage signal to physical distance, which may be displayed on an LCD display on the analog controller. The analog controller may further be connected to a robot controller through an interface PCB, in which case a voltage signal corresponding to an abnormal position of the transfer blade is transmitted to the robot controller and the wafer transfer operation is terminated.

20 Claims, 2 Drawing Sheets

Z-AXIS MONITORING APPARATUS FOR ROBOT BLADE

FIELD OF THE INVENTION

The present invention relates to integrated cluster tools used in the processing of semiconductors. More particularly, the present invention relates to a z-axis monitoring apparatus for monitoring the Z-axis position of a wafer support blade on a transfer robot which transfers wafers among multiple chambers in an integrated cluster tool.

BACKGROUND OF THE INVENTION

In the semiconductor production industry, various processing steps are used to fabricate integrated circuits on a semiconductor wafer. These steps include the deposition of layers of different materials including metallization layers, passivation layers and insulation layers on the wafer substrate, as well as photoresist stripping and sidewall passivation polymer layer removal. In modern memory devices, for example, multiple layers of metal conductors are required for providing a multi-layer metal interconnection structure in defining a circuit on the wafer. Chemical vapor deposition (CVD) processes are widely used to form layers of materials on a semiconductor wafer. Other processing steps in the fabrication of the circuits include formation of a photoresist or other mask such as titanium oxide or silicon oxide, in the form of the desired metal interconnection pattern, using standard lithographic techniques; subjecting the wafer substrate to a dry etching process to remove the conducting layer from the areas not covered by the mask, thereby leaving the metal layer in the form of the masked pattern; removing the mask layer using reactive plasma and chlorine gas, thereby exposing the top surface of the metal interconnect layer; cooling and drying the wafer substrate by applying water and nitrogen gas to the wafer substrate; and removing or stripping polymer residues from the wafer substrate.

CVD processes include thermal deposition processes, in which a gas is reacted with the heated surface of a semiconductor wafer substrate, as well as plasma-enhanced CVD processes, in which a gas is subjected to electromagnetic energy in order to transform the gas into a more reactive plasma. Forming a plasma can lower the temperature required to deposit a layer on the wafer substrate, to increase the rate of layer deposition, or both. However, in plasma process chambers used to carry out these various CVD processes, materials such as polymers are coated onto the chamber walls and other interior chamber components and surfaces during the processes. These polymer coatings frequently generate particles which inadvertently become dislodged from the surfaces and contaminate the wafers.

The chemical vapor deposition, etching and other processes used in the formation of integrated circuits on the wafer substrate are carried out in multiple process chambers. The process chambers are typically arranged in the form of an integrated cluster tool, in which multiple process chambers are disposed around a central transfer chamber equipped with a wafer transport system for transporting the wafers among the multiple process chambers. By eliminating the need to transport the wafers large distances from one chamber to another, cluster tools facilitate integration of the multiple process steps and improve wafer manufacturing throughput.

A typical conventional integrated cluster tool is generally indicated by reference numeral 10 in FIG. 1. An integrated cluster tool 10 such as a Centura HP 5200 tool sold by the Applied Materials Corp. of Santa Clara, Calif., includes one or a pair of adjacent loadlock chambers 12, each of which receives a wafer cassette or holder 13 holding multiple semiconductor wafers 28. The loadlock chambers 12 are flanked by an orientation chamber 14 and a cooldown chamber 16. Multiple process chambers 18 for carrying out various processes in the fabrication of integrated circuits on the wafers 28 are positioned with the orientation chamber 14, the cooldown chamber 16 and the loadlock chambers 12 around a central transfer chamber 20. A transfer robot 22 in the transfer chamber 20 is fitted with a transfer blade 24 which receives and supports the individual wafers 28 from the wafer cassette or holder 13 in the loadlock chamber 12. The transfer robot 22 is capable of rotating the transfer blade 24 in the clockwise or counterclockwise direction in the transfer chamber 20, and the transfer blade 24 can extend or retract to facilitate placement and removal of the wafers 28 in and from the load lock chambers 12, the orientation chamber 14, the cooldown chamber 16 and the process chambers 18.

In operation, the transfer blade 24 initially removes a wafer 28 from the wafer cassette 13 and then inserts the wafer 28 in the orientation chamber 14. The transfer robot 22 then transfers the wafer 28 from the orientation chamber 14 to one or more of the process chambers 18, where the wafer 28 is subjected to a chemical vapor deposition or other process. From the process chamber 18, the transfer robot 22 transfers the wafer 28 to the cooldown chamber 16, and ultimately, back to the wafer cassette or holder 13 in the loadlock chamber 12.

As illustrated in FIG. 2, a standard optical wafer sensor 30 is typically provided on the transfer chamber lid 26 of the transfer chamber 20 and emits a light beam 32 which passes first through a view port (not shown) in the transfer chamber lid 26 and then through an opening 25 in the transfer blade 24 when no wafer is supported on the transfer blade 24, as illustrated. The light is reflected back through the opening 25 to the sensor 30, which transmits a DI signal to the system controller (not shown) to indicate that a wafer is not supported on the transfer blade 24. When a wafer is supported on the transfer blade 24, the light from the sensor 30 is absorbed by the wafer, which covers the opening 25. Consequently, the sensor 30 transmits an appropriate signal to the system controller to indicate the presence of the wafer on the transfer blade 24. The optical wafer sensor 30 typically operates on 24V DC current.

One of the problems associated with the conventional wafer sensor 30 is that the sensor 30 is incapable of detecting the Z-axis position of the transfer blade 24 for accurate insertion and retrieval of the wafers 28 into and out of the wafer cassette 13 in the loadlock chamber 12. The tolerance space between the transfer blade 24 and the wafer cassette 13 in the wafer insertion and retrieval operations is typically about 3 mm. Consequently, distortions in the configuration of the transfer blade 24 due to, for example, heat from the process chambers 18 may cause the transfer blade 24 to exceed the permissible Z-axis tolerance of the transfer blade 24. Consequently, the tilted transfer blade 24 may scratch the wafers upon removal or replacement thereof in the wafer cassette 13, significantly reducing the wafer yield.

Accordingly, an apparatus is needed for monitoring the Z-axis position of a wafer transfer blade on a transfer robot.

An object of the present invention is to provide an apparatus for reducing loss in wafer yield in the processing of wafers in an integrated cluster tool.

Another object of the present invention is to provide an apparatus for preventing scraping of wafers in the removal and insertion of semiconductor wafers from and into a loadlock chamber of an integrated cluster tool due to a distorted transfer blade on a transfer robot.

Still another object of the present invention is to provide an apparatus for monitoring the Z-axis position of a transfer blade on a wafer transfer robot.

Another object of the present invention is to provide an apparatus for detecting and indicating the presence or absence of a wafer on a transfer blade of a wafer transfer robot.

Yet another object of the present invention is to provide an apparatus for facilitating corrective Z-axis positioning of a transfer blade on a wafer transfer robot in order to prevent inadvertent scraping of wafers in the insertion and removal of the wafers into and out of a loadlock chamber.

A still further object of the present invention is to provide a method of enhancing the yield of semiconductor wafers processed in a semiconductor fabrication facility by reducing or preventing inadvertent scraping of the wafers due to distortion of a wafer transfer blade on a transfer robot.

SUMMARY OF THE INVENTION

In accordance with these and other objects and advantages, the present invention comprises an apparatus for monitoring the Z-axis position of a transfer blade on a wafer transfer robot which transfers wafers among multiple chambers in a semiconductor fabrication facility. The invention comprises a CCD laser displacement sensor which measures the height or Z-axis position of the transfer blade and generates an analog voltage the value of which depends on the height of the transfer blade. An analog controller connected to the CCD laser displacement sensor converts the analog voltage signal to physical distance, which may be displayed on an LCD display on the analog controller. The analog controller may further be connected to a robot controller through an interface PCB, in which case a voltage signal corresponding to an abnormal position of the transfer blade is transmitted to the robot controller and the wafer transfer operation is terminated.

BRIEF DESCRIPTION OF THE DRAWINGS

The invention will now be described, by way of example, with reference to the accompanying drawings, in which.

DESCRIPTION OF THE PREFERRED EMBODIMENTS

The present invention has particularly beneficial utility in monitoring the Z-axis position of a transfer blade on a wafer transfer robot in an integrated cluster tool used in the processing of semiconductors. However, the invention is not so limited in application, and while references may be made to such integrated cluster tools, the invention is more generally applicable to monitoring the vertical or Z-axis position of objects in a variety of industrial and product applications.

Figure 1:
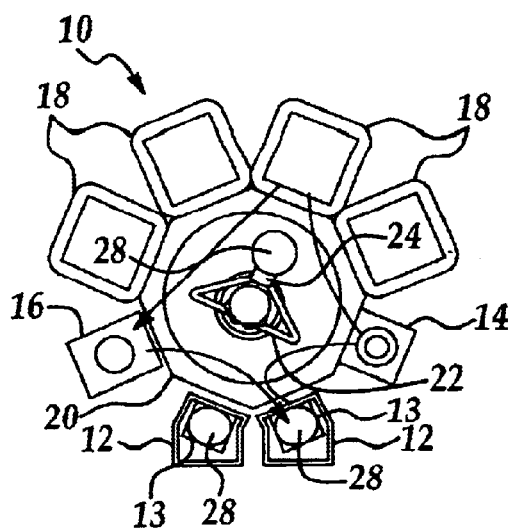
FIG. 1 is a top view of a typical conventional integrated cluster tool for the processing of semiconductor wafers.
Figure 2:
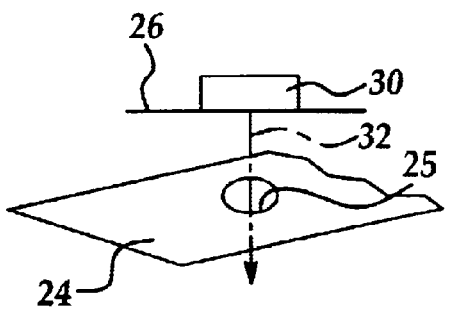
FIG. 2 is a schematic view illustrating a conventional sensor for detecting the presence of a wafer on a transfer blade.
Figure 3:
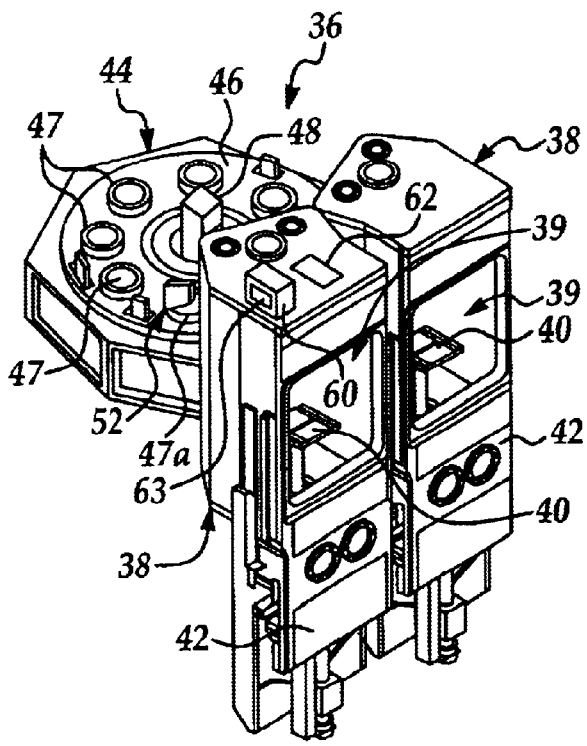
FIG. 3 is a perspective view of an integrated cluster tool in implementation of the present invention.
Figure 4:
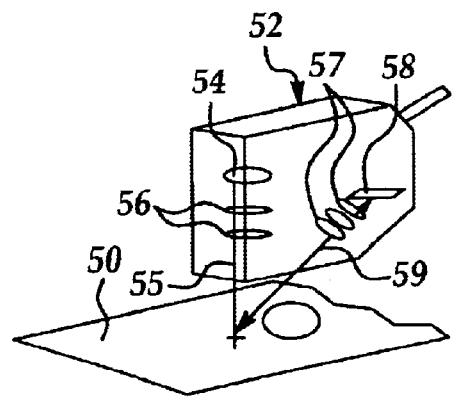
FIG. 4 illustrates a CCD displacement sensor in application of the present invention.
Figure 5:
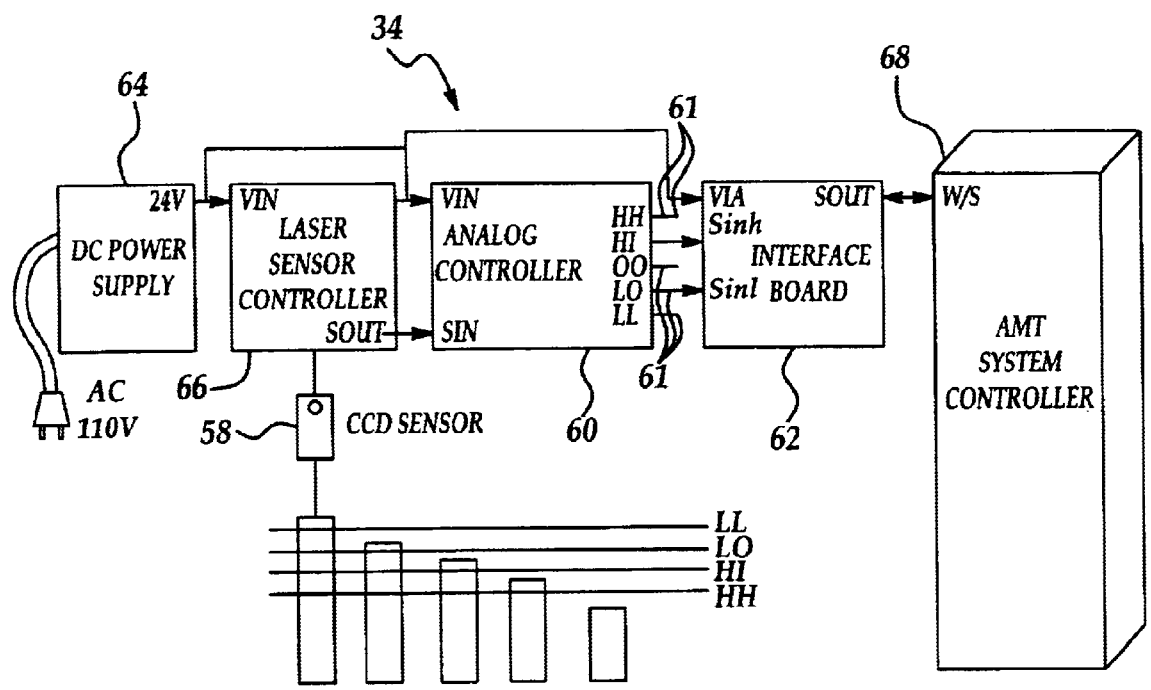
FIG. 5 is a schematic view illustrating the various components of the present invention.

Referring to FIGS. 3–5, an integrated cluster tool in implementation of the present invention is generally indicated by reference numeral 36 in FIG. 3 and typically includes a pair of loadlock chambers 38 each having a chamber interior 39 that houses a cassette stage 40 for receiving a wafer-supporting cassette (not illustrated). The chamber interior 39 is closed by a loadlock door 42. The loadlock chambers 38 are located adjacent to a transfer chamber 44 closed by a removable transfer chamber lid 46 having multiple viewing ports 47 for viewing the interior of the transfer chamber 44. A transfer robot 48 is contained in the transfer chamber 44 and is fitted with a transfer blade 50 (FIG. 4). The transfer robot 48 is operated to remove wafers (not shown) from the loadlock chambers 38 and among an orientation chamber (not shown), multiple process chambers (not shown) and a cooldown chamber (not shown) positioned around the transfer chamber 44, and the transfer robot 48 places the wafers back in the loadlock chamber 38 after processing.

The Z-axis monitoring apparatus of the present invention is generally indicated by reference numeral 34 in the schematic of FIG. 5 and includes a CCD sensor housing 52 (FIG. 4) which, as illustrated in FIG. 3, is mounted directly above a viewing port 47a in the transfer chamber lid 46 adjacent to the loadlock chamber 38. As illustrated in FIG. 4, the CCD sensor housing 52 contains a CCD (charge-coupled device) displacement sensor 58, which may be a CCD sensor manufactured and sold by the Keyence Co., Ltd. A laser diode 54 is included in the CCD sensor housing 52, and a pair of spaced-apart optical lenses 56 is positioned directly beneath the laser diode 54. The laser diode 54 and optical lenses 56 are located along a common vertical axis 55. A set of condenser lenses 57, which may be three in number, is provided in adjacent relationship to the CCD displacement sensor 58. The condenser lenses 57 and CCD displacement sensor 58 are located along a common reflection axis 59 that is disposed at an angle with respect to the vertical axis 55. The vertical axis 55 indicates the path of laser light emitted from the laser diode 54 and through the optical lenses 56 and the viewing port 47a (FIG. 3) in the transfer chamber lid 46, to the transfer blade 50, in application of the present invention as hereinafter further described. Some of the laser light is reflected from the transfer blade 50, back through the viewing port 47a and through the condenser lenses 57 to the CCD displacement sensor 58, respectively, along the path indicated by the reflection axis 59.

As illustrated in FIG. 5, the CCD sensor 58 is connected to a CCD laser sensor controller 66, which receives an operational current of typically 24 volts from a DC power supply 64. The DC power supply 64 may receive 110 volts of AC current. A "signal out" port of the CCD laser sensor controller 66 is connected to a "signal in" port of an RD analog controller 60, which receives an operational current of 24 volts from the DC power supply 64. The analog controller 60 may include an LCD display 63 for displaying the height of the transfer blade 50, as hereinafter further described.

Figure 6:
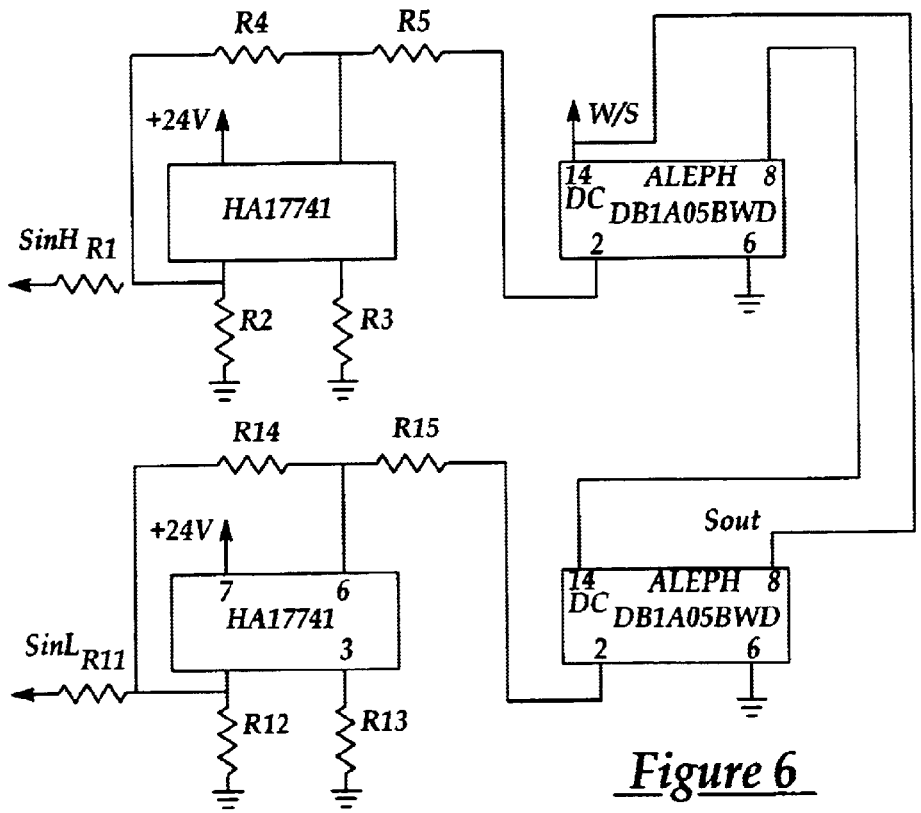
FIG. 6 is an electrical schematic illustrating a typical wiring configuration for an interface PCB of the present invention.

In one embodiment of the present invention, the analog controller 60 includes five signal ports 61 for purposes hereinafter described. The signal ports 61 are connected to a "signal high" port and a "signal low" port on an interface PCB 62 which receives an operational current of 24 volts from the DC power supply 64. A "signal out" port on the interface PCB 62 is connected to a wafer sensor signal (W/S) port on an AMAT system controller 68 which controls the various components of the integrated cluster tool 36, including the robot 48. An electrical schematic for the interface PCB is shown in FIG. 6. As illustrated in FIG. 3, the RD analog controller 60 and the interface PCB may be mounted on the top of the loadlock chamber 38.

Referring next to FIGS. 4 and 5, in typical application the Z-axis monitoring apparatus 34 of the present invention is capable of monitoring the Z-axis position of the transfer blade 50 inside the transfer chamber 44 of the integrated cluster tool 36 in order to prevent inaccurate insertion of the transfer blade 50 in a wafer cassette (not shown) contained in the loadlock chamber 38 and scratching wafers (not shown) upon removal of the wafers from the cassette. To this end, the CCD displacement sensor 58 is capable of detecting a Z-axis distortion of the transfer blade 50 to within about 1 μm. In operation, the transfer robot 48 initially extends the transfer blade 50 toward the loadlock chamber 38 preparatory to removing a wafer from the cassette in the loadlock chamber 38. As it moves toward the loadlock chamber 38, the transfer blade 50 passes beneath the viewing port 47a in the transfer chamber lid 46. Simultaneously, the laser diode 54 in the CCD sensor housing 52 emits a laser beam having a path indicated by the vertical axis 55 in FIGS. 4 and 4A, which laser beam passes through the vertical optical lenses 56 and through the viewing port 47a, respectively, and strikes the transfer blade 50. Some of the laser light is reflected from the transfer blade 50 along the path indicated by the reflection axis 59, and passes through the condenser lenses 57 which condense the reflected laser light onto the CCD displacement sensor 58. The reflected laser light forms an image on the CCD displacement sensor 58, and the image of the reflected light varies depending on the Z-axis position of the transfer blade 50. The CCD displacement sensor 58 may be calibrated to detect variations in the reflected image corresponding to Z-axis positions of the transfer blade 50 throughout a range of typically about 10.0 mm.

Depending on the Z-axis position of the transfer blade 50, the CCD displacement sensor 58 generates an analog voltage signal typically in the range of from +5 volts to −5 volts. For example, an ideal Z-axis position of the transfer blade 50 for wafer transfer may correspond to 0 volts, whereas a "LO" position of the transfer blade 50, as illustrated in FIG. 5, may correspond to −3 volts and an "LL" (low—low) position of the transfer blade 50 may correspond to −5 volts. Conversely, a "HI" position of the transfer blade 50 may correspond to +3 volts, and an "HH" (high high) position of the transfer blade 50 may correspond to +5 volts. This analog voltage signal is transmitted from the CCD sensor 58 to the laser sensor controller 66 and from the "signal out" port of the laser sensor controller 66 to the "signal in" port of the analog controller 60. The analog controller 60 converts the analog voltage signal to a Z-axis position of the transfer blade 50, typically in millimeters, and may display this Z-axis position of the transfer blade 50 in millimeters on the LCD display 63 of the analog controller 60.

In the embodiment of the apparatus 34 in which the analog controller 60 is connected to the system controller 68 through the interface PCB 62, the analog controller 60 sends the analog voltage signal to the appropriate signal port 61. The signal ports 61 may range from "high high" (HH), "high" (HI), "low" (LO), or "low low" (LL). In the event that the transfer blade 50 is at the ideal height for the wafer transferring operation and no wafer is supported on the transfer blade 50, the analog voltage signal sent from the laser sensor controller 66 to the analog controller 60 is 0 volts. In that case, no analog voltage signal is transmitted from the signal ports 61 on the analog controller 60 to the "signal high" port or the "signal low" port on the PCB interface 62. The wafer sensor signal transmitted from the "signal out" port of the interface PCB 62 to the W/S port on the system controller 68 is 24 volts. Accordingly, the transfer robot 48 continues the wafer-transfer operation as the transfer blade 50 is inserted in the chamber interior 39 of the loadlock chamber 38 prior to receiving a wafer (not shown) from a wafer cassette (not shown) in the chamber interior 39.

After the transfer blade 50 is positioned in the chamber interior 39 of the loadlock chamber 38 and as the wafer is moved from the loadlock chamber 38 onto the transfer blade 50, the CCD sensor 58 transmits the analog voltage signal corresponding to the "HI" Z-axis position to the "signal in" port of the analog controller 60 through the "signal out" port of the laser sensor controller 66. The analog controller 60, in turn, sends the analog voltage signal to the HI signal port 61 thereof. The HI signal port 61 then sends the analog voltage signal to the interface PCB 62 at the "signal high" port thereof, in which case the wafer sensor signal sent from the "signal out" port of the interface PCB 62 to the WIS port of the system controller 68 is 0 volts. This prompts the system controller 68 to continue operation of the transfer robot 48 and movement of the transfer blade 50 and wafer supported thereon to the appropriate chambers (not illustrated) of the integrated cluster tool 36.

In the event that a wafer supported on the transfer blade 50 inadvertently slides in and out of a wafer pocket (not illustrated) on the transfer blade 50 during the wafer-transfer operation, the analog voltage signal corresponding to the highest limit (HH) of the transfer blade 50 is sent from the CCD sensor 58 to the HH port 61 of the analog controller 60, and from the HH port 61 to the "signal high" port on the interface PCB 62. This causes the wafer sensor signal transmitted from the "signal out" port of the interface PCB 62 to the W/S port on the system controller 68 to increase from 0 volts to 24 volts. Consequently, the system controller 68 displays a "no wafer on blade" alarm message and terminates further operation of the transfer robot 48 and wafer-transferring movement of the transfer blade 50.

In the event that the transfer blade 50 is distorted and the reflective portion of the transfer blade 50 is located at a Z-axis position which is higher than the ideal position, the CCD sensor transmits the analog voltage signal corresponding to the "HI" or "HH" Z-axis position to the "signal in" port of the analog controller 60 through the "signal out" port of the laser sensor controller 66. The analog controller 60, in turn, sends the analog voltage signal to the HI signal port 61 or HH signal port 61 thereof, as appropriate. The HI or HH signal port 61 then sends the analog voltage signal to the interface PCB 62 at the "signal high" port thereof, in which case the wafer sensor signal sent from the "signal out" port of the interface PCB to the W/S port of the system controller 68 decreases from 24 volts to 0 volts. This prompts the system controller 68 to display a "wafer on blade" alarm message and terminate operation of the transfer robot 48 and movement of the transfer blade 50 until the transfer blade 50 can be adjusted, fixed or replaced.

In the event that the transfer blade 50 is distorted and the reflective portion of the transfer blade 50 is located at a Z-axis position which is lower than the ideal position, the analog controller 60 sends the analog voltage signal from the CCD sensor 58 and laser sensor controller 66 to the LL signal port 61 or LO signal port 61 thereof, as appropriate. The LL or LO signal port 61 then sends the analog voltage signal to the interface PCB 62 at the "signal low" port thereof, in which case the wafer sensor signal sent from the "signal out" port of the interface PCB to the WIS port of the system controller 68 decreases from 24 volts to 0 volts. This prompts the system controller 68 to display a "wafer on blade" alarm message and terminate operation of the transfer robot 48 and movement of the transfer blade 50 until the transfer blade 50 can be adjusted, fixed or replaced.

Table I below summarizes the wafer sensor signal (W/S) and alarm message displayed by the system controller 68 for each status of the transfer blade 50.

TABLE I

| Status | Wafer Sensor Signal (W/S) | Alarm Message |
| --- | --- | --- |
| Wafer sliding | 0 V - - - - - - > +24 V | No wafer on blade |
| Wafer on blade | 0 V | N/A |
| No wafer on blade | +24 V | N/A |
| No wafer on blade and blade distorted | +24 V - - - - - - > 0 V | Wafer on blade |

While the preferred embodiments of the invention have been described above, it will be recognized and understood that various modifications can be made in the invention and the appended claims are intended to cover all such modifications which may fall within the spirit and scope of the invention.

What is claimed is:

1. An apparatus for monitoring the Z-axis position of an object, comprising:
    a laser source for emitting a laser beam onto the object, whereby said laser beam is reflected from the object;
    a charge-coupled device displacement sensor disposed in proximity to said laser source for receiving said laser beam reflected from the object and generating an analog voltage signal having a magnitude corresponding to a distance between said displacement sensor and the object; and
    an analog controller connected to said displacement sensor for converting said magnitude of said analog voltage signal to a Z-axis value.

2. The apparatus of claim 1 further comprising a laser senser controller connected to said analog controller and wherein said displacement sensor is connected to said laser sensor controller.

3. The apparatus of claim 2 further comprising an LCD display provided on said analog controller for displaying said Z-axis value.

4. The apparatus of claim 1 further comprising a sensor housing and wherein said displacement sensor is provided in said sensor housing.

5. The apparatus of claim 4 further comprising an LCD display provided on said analog controller for displaying said Z-axis value.

6. The apparatus of claim 4 further comprising a laser senser controller connected to said analog controller and wherein said displacement sensor is connected to said laser sensor controller.

7. The apparatus of claim 6 further comprising an LCD display provided on said analog controller for displaying said Z-axis value.

8. An apparatus for monitoring the Z-axis position of an object, comprising:
    a laser source for emitting a laser beam onto the object, whereby said laser beam is reflected from the object;
    a displacement sensor disposed in proximity to said laser source for receiving said laser beam reflected from the object and generating an analog voltage signal having a magnitude corresponding to a distance between said displacement sensor and the object;
    an analog controller connected to said displacement sensor for converting said magnitude of said analog voltage signal to a Z-axis value; and
    an LCD display provided on said analog controller for displaying said Z-axis value.

9. An apparatus for monitoring the Z-axis position of a transfer blade of a substrate transfer robot controlled by a system controller, said apparatus comprising:
    a laser source for emitting a laser beam onto the transfer blade, whereby said laser beam is reflected from the transfer blade;
    a charge-coupled device displacement sensor disposed in proximity to said laser source for receiving said laser beam reflected from the transfer blade and generating an analog voltage signal having a magnitude corresponding to a distance between said displacement sensor and the transfer blade;
    an analog controller connected to said displacement sensor for converting said magnitude of said analog voltage signal to a Z-axis value; and
    an interface circuit connected to said analog controller for receiving said analog voltage signal from said analog controller and transmitting a wafer sensor signal corresponding to said analog voltage signal to the system controller.

10. The apparatus of claim 9 further comprising an LCD display provided on said analog controller for displaying said Z-axis value.

11. The apparatus of claim 9 further comprising a laser senser controller connected to said analog controller and wherein said displacement sensor is connected to said laser sensor controller.

12. The apparatus of claim 11 further comprising an LCD display provided on said analog controller for displaying said Z-axis value.

13. A method of monitoring the Z-axis position of a transfer blade of a substrate transfer robot controlled by a system controller, said method comprising:
    providing a laser source above the transfer blade;
    providing a displacement sensor in proximity to said laser source;
    connecting an analog controller to said displacement sensor;
    connecting an interface circuit to said analog controller;
    measuring a distance between said displacement sensor and the transfer blade by emitting a laser beam from said laser source onto the transfer blade and reflecting said laser beam from said transfer blade onto said displacement sensor;
    generating an analog voltage signal having a magnitude corresponding to said distance;
    transmitting said analog voltage signal to said analog controller and said interface circuit;
    transmitting a wafer sensor signal from said interface circuit to the system controller; and terminating operation of said substrate transfer robot by operation of said system controller when said magnitude of said analog voltage signal corresponds to selected voltage values.

14. The method of claim 13 wherein said selected voltage values are in the range of from about +2 volts to about +5 volts and in the range of from about −2 volts to about −5 volts.

15. The method of claim 13 further comprising the steps of providing an LCD display on said analog controller, converting said analog voltage signal to a Z-axis value and displaying said Z-axis value on said LCD display.

16. The method of claim 15 wherein said selected voltage values are in the range of from about +2 volts to about +5 volts and in the range of from about −2 volts to about −5 volts.

17. The method of claim 13 further comprising a sensor housing and wherein said displacement sensor is provided in said sensor housing.

18. The method of claim 17 wherein said selected voltage values are in the range of from about +2 volts to about +5 volts and in the range of from about −2 volt to about −5 volts.

19. The method of claim 17 further comprising the steps of providing an LCD display on said analog controller, converting said analog voltage signal to a Z-axis value and displaying said Z-axis value on said LCD display.

20. The method of claim 19 wherein said selected voltage values are in the range of from about +2 volts to about +5 volts and in the range of from about −2 volts to about −5 volts.

* * * * *